Aug. 25, 1964  J. C. O'NEAL  3,145,689
PRESSURE WARNING DEVICE FOR A PNEUMATIC TIRE
Filed Feb. 1, 1963
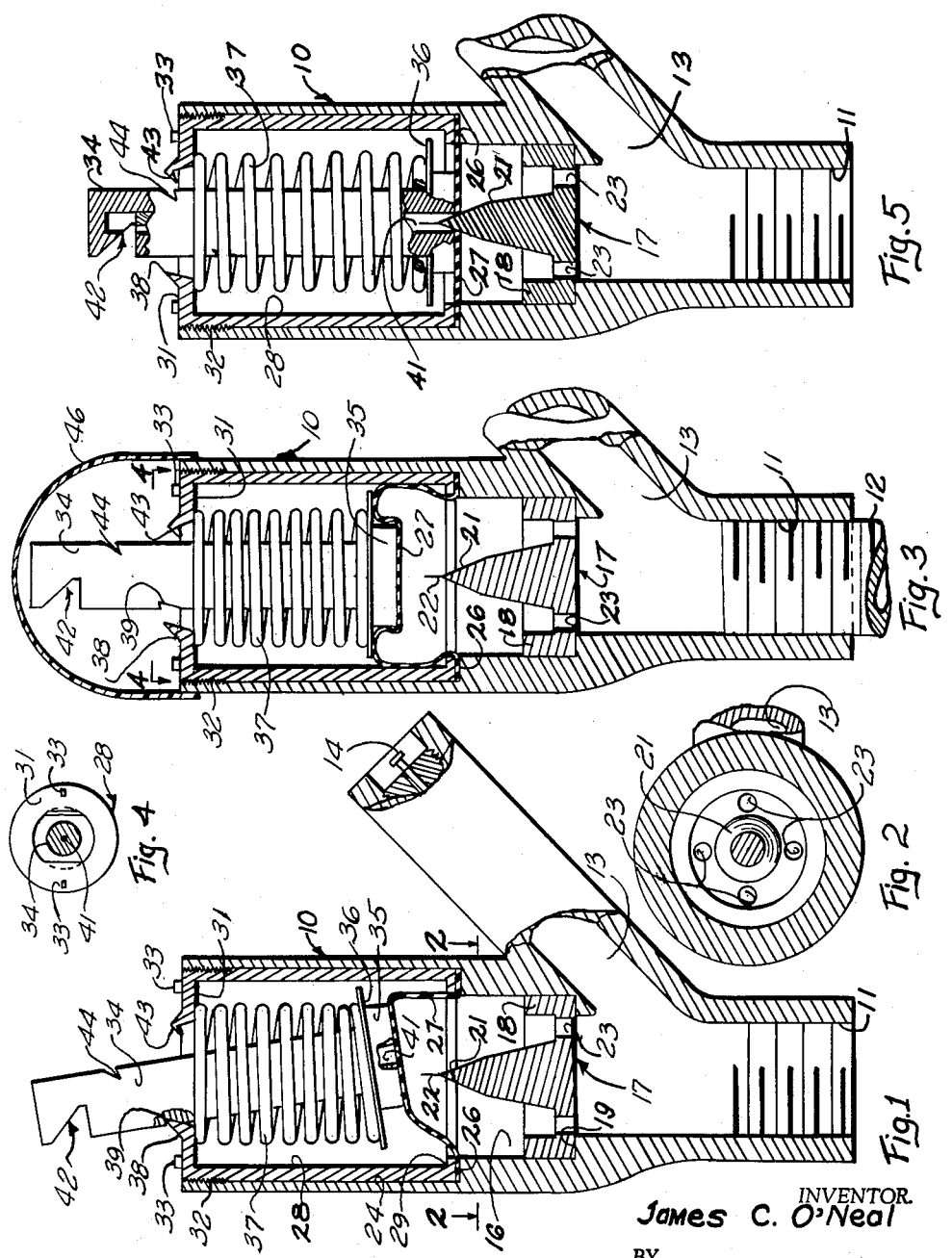
INVENTOR.
James C. O'Neal

United States Patent Office 3,145,689
Patented Aug. 25, 1964

3,145,689
PRESSURE WARNING DEVICE FOR A
PNEUMATIC TIRE
James C. O'Neal, 2806½ Ensley Ave., Birmingham, Ala.
Filed Feb. 1, 1963, Ser. No. 255,564
9 Claims. (Cl. 116—34)

This invention relates to a pressure warning device for a pneumatic tire and more particularly to a safety device which shall embody a movable diaphragm which is adapted to move into engagement with a sharp projection after the pressure within the tire has changed a predetermined amount, whereby air flows through the diaphragm to actuate a warning device.

An object of my invention is to provide a pressure warning device for pneumatic tires in which the diaphragm is urged toward a sharp projection by spring means whereby the diaphragm is held out of engagement with the sharp projection by the force exerted by the pressure within the tire.

Another object of my invention is to provide a pressure warning device for a pneumatic tire of the character designated in which a lateral air inlet conduit communicates with the warning device beneath the tire and the diaphragm whereby the tire may be inflated and deflated independently of the warning device.

Another object of my invention is to provide a low pressure warning device of the character designated in which the diaphragm is replaceable, thereby permitting the unit to be used over and over again by merely replacing the diaphragm.

A further object of my invention is to provide a pressure warning device for a pneumatic tire of the character designated in which releasable catch means are employed to hold the diaphragm selectively in engagement with the sharp projection or out of engagement with the sharp projection.

A still further object of my invention is to provide a pressure warning device of the character designated which shall be simple of construction, economical of manufacture and one which is adapted for installation on conventional type valve stems for pneumatic tires both single and dual.

Apparatus embodying features of my invention is illustrated in the accompanying drawing, forming a part of this application, in which:

FIG. 1 is a vertical sectional view of the warning device showing the diaphragm in the position that it assumes prior to inflation of the tire;

FIG. 2 is a sectional view taken generally along the line 2—2 of FIG. 1;

FIG. 3 is a vertical sectional view showing the diaphragm in the position that it assumes after the tire has been inflated;

FIG. 4 is a view taken generally along the line 4—4 of FIG. 3, drawn to a smaller scale; and, FIG. 5 is a vertical sectional view showing the apparatus after the diaphragm has been ruptured upon a predetermined decrease of pressure within the tire.

Referring now to the drawing for a better understanding of my invention, I show a cylindrical housing 10 having internal threads 11 adjacent one end thereof in position to engage the external threads of a valve stem 12 of a pneumatic tire. Air is introduced into the lower portion of the housing 10 into the valve stem 12 through lateral conduit 13 having the usual check valve 14 therein which permits air to be introduced into the lateral conduit 13 but prevents air from escaping therefrom.

An enlarged diameter portion 16 is provided in the housing 10 above the lateral conduit 13 for receiving a transverse member 17. Preferably, the transverse member 17 is in the form of a disc-like member having an upstanding annular flange 18 which engages the enlarged diameter portion 16 with a press fit. As shown in FIGS. 1, 3 and 5, an annular shoulder 19 is defined adjacent the lower end of the enlarged diameter portion 16 to provide a seat for the transverse member 17. Extending upwardly from the central portion of the transverse member 17 is a projection 21 having a sharp needle-like upper end indicated at 22. A plurality of passageways 23 are provided in the transverse member 17 whereby air is free to flow upwardly through the transverse member 17.

A second enlarged diameter portion 24 is provided in the cylindrical housing 10 above the enlarged diameter portion 16. The lower end of the enlarged diameter portion 24 defines an annular shoulder 26 in position to receive the periphery of a disc-like diaphragm 27 which is formed of a suitable material, such as rubber, neoprene or the like. Telescoping within the enlarged diameter portion 24 of the housing 10 is a sleeve-like member 28 having an inturned annular flange 29 adjacent one end thereof in position to engage the peripheral edge of the diaphragm 27. An inturned annular flange 31 is provided at the opposite end of the sleeve-like member 28, as shown. The sleeve-like member 28 is secured to the housing 10 by a threaded connection indicated generally at 32 whereby upon securing the sleeve in place, the annular flange 29 forces the peripheral edge of the diaphragm 27 into engagement with the annular shoulder 26 to thereby form an air-tight connection between the diaphragm and the housing. The sleeve member 28 may be rotated by suitable means, such as by providing upstanding tool engaging members 33 on the inturned flanges 31.

One end of an elongated member 34 is bonded to the central portion of the flexible diaphragm 27 whereby the elongated member moves with the central portion of the diaphragm as it flexes toward and away from the sharp projection 22. Surrounding the elongated member 34 and secured rigidly thereto is a washer-like member 36 which forms a spring abutment for a compression spring 37. Surrounding the elongated member 34 intermediate the diaphragm 27 and the washer-like member 36 is an annular collar 35 which aids in holding the diaphragm 27 in a uniform position, as shown in FIG. 3, after the tire is inflated. As shown in FIGS. 1, 3 and 5 the end of the compression spring opposite the end thereof engaging the washer-like member 36 engages the inturned annular flange 31 whereby the elongated member 34 and the diaphragm 27 are urged toward the sharp projection 22.

Suitable catch means is provided between the inturned annular flange 31 and the elongated member 34 for holding the diaphragm out of engagement with the sharp projection 22 before inflation of the tire. The catch means may be in the form of an upwardly and inwardly extending projection 38 which is mounted in position to engage a notch or recess 39 provided in the adjacent side of the elongated member 34, as shown in FIG. 1. Accordingly, with the projection 38 in the notch 39, movement of the elongated member 34 and the diaphragm 29 toward the sharp projection 22 is limited whereby the diaphragm 27 remains out of contact with the sharp projection prior to inflation of the tire. After inflation of the tire, the internal pressure of the tire causes the compression spring 37 to be compressed and causes the diaphragm 27 to assume automatically the position shown in FIG. 3.

A longitudinally extending passageway 41 is provided in the elongated member 34 in position to receive the adjacent end of the projection 21 after the pressure within the tire has decreased to a predetermined amount, as shown in FIG. 5. That is, upon a decrease in pressure within the tire below a predetermined point, the diaphragm 27 is forced downwardly by the compression spring 37 toward the position shown in FIG. 5 whereupon the sharp projection 22 ruptures the diaphragm. After rupture of the diaphragm by the sharp projection 22, air passes upwardly through the passageway 41 whereupon it actuates a suitable warning device, such as a whistle indicated generally at 42. While I show the warning device as being in the form of a whistle, it will be apparent that any suitable air actuated warning device may be employed, such as warning devices which dispense a powder or liquid upon forcing air through the passageway 41. Since such warning devices are well known in the art, no detail description thereof is deemed necessary.

To prevent the continuous escape of air after the warning device has been actuated, I machine the lower end of the opening or passageway 41 whereby it corresponds generally to the exterior surface of the projection 21. Accordingly, air is free to move upwardly through the passageway 41 after rupture of the diaphragm 27 by the sharp projection 21 until the lower end of the passageway 41 engages the downwardly flaring surface of the projection 21. In the event it is desired to stop the actuation of the warning device 42 prior to the time that the lower end of the passageway 41 engages the projection 21, I provide latch means between the elongated member 34 and the housing 10 for holding the elongated member 34 in firm engagement with the projection 21. This latch means may be in the form of an inwardly and downwardly extending member 43 which is adapted to engage a notch or recess 44 provided in a side of the elongated member 34. That is to say, the end of the elongated member 34 carrying the warning device 42 is moved laterally whereby the projection 43 engages the notch 44. Since this would only be a slight amount of lateral movement of the upper end of the elongated member 34, there would be very little movement of the lower end thereof whereby it remains in firm engagement with the projection 21 to seal off or retard the movement of air upwardly through the passageway 41 to the warning device 42.

To prevent foreign materials from entering the housing 10, I provide a suitable closure member 46, as shown in FIG. 3. Preferably, the closure member 46 is formed of a resilient material, such as plastic, whereby it may be readily snapped onto the housing 10 and blown thereoff upon the discharge of air through the warning device 42. That is, as air is discharged within the cover member 46, the pressure of the air increases and causes the cover member 46 to be blown off whereupon the warning device 42 is actuated.

From the foregoing description, the operation of my improved warning device will be readily understood. The threaded section 11 of the housing 10 is threaded onto the threaded end of the valve stem 12 whereby the housing 10 forms a continuation of the valve stem 12. It will be understood that the usual check valve for the valve stem 12 will be removed prior to installation of the housing 10. Prior to installation, the elongated member 34 is moved to the inclined position, as shown in FIG. 1, whereby the upwardly and inwardly extending projection 38 engages the notch 39 to hold the diaphragm 27 out of engagement with the sharp projection 22.

After mounting the housing 10 on the valve stem 12, air is introduced past the check valve 14 into the conduit 13 whereby the tire is inflated. As the pressure within the tire increases, the spring 37 is compressed and the diaphragm 27 assumes the position shown in FIG. 3 whereby it is out of contact with the sharp projection 22. The warning device remains in the position shown in FIG. 3 until the pressure within the tire is reduced a predetermined amount. At this time, the diaphragm 27 moves into engagement with the sharp projection 22 whereupon the diaphragm is ruptured. After rupture of the flexible diaphragm 27, air escapes upwardly through the passageway 41 whereupon the cover member 46 is blown off and the warning device 42 is actuated. The warning device 42 continues to be actuated by the air until the lower end of the passageway 41 moves into firm engagement with the adjacent surface of the projection 21. However, it will be understood that the warning device 42 may be cut off at any time by moving the upper end of the elongated member 34 laterally whereby notch 44 engages the downwardly and inwardly extending projection 43.

Since the diaphragm 27 forms an air-tight seal with the housing 10, the air flowing upwardly through the passageway 23 provided in the transverse member 17 cannot move beyond the diaphragm 27 until the diaphragm is ruptured. By bonding the diaphragm to the lower end of the elongated member 34, only the portion of the diaphragm within the confines of the passageway 41 is ruptured.

From the foregoing, it will be seen that I have devised an improved warning device for pneumatic tires which is positive in operation and which may be installed on conventional type valve stems with a minimum of effort. Also, by providing quick actuating means for deenergizing the warning device after it is once set off, it is not necessary to actuate the warning device continuously until the tire is completely deflated. Also, by providing the close contact between the projection 21 and the passageway 41 after the elongated member 34 has moved to the position shown in FIG. 5, flow of air from the tire is retarded, thereby preventing complete deflation of the tire and at the same time permitting the warning device to be actuated for a sufficient length of time to warn the operator. Furthermore, by providing a warning device which merely forms a continuation of the conventional type valve stem, the warning device is inexpensive to manufacture and is very easy to install.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In a pressure warning device for a pneumatic tire having a valve stem:
   (a) a housing adapted to be connected at one end to the valve stem,
   (b) a movable diaphragm extending transversely of said housing,
   (c) means securing the periphery of said diaphragm to said housing to provide an air tight connection therewith and permit flexing of an inner portion of said diaphragm,
   (d) a sharp projection carried by said housing in position to rupture said inner portion of the diaphragm upon a predetermined amount of movement of said inner portion of the diaphragm toward said projection,
   (e) resilient means urging said diaphragm toward said projection with a force to move said diaphragm into contact with said projection upon a predetermined change in pressure within the tire whereby said projection ruptures said diaphragm to permit the escape of air through said diaphragm,
   (f) warning means carried by the device in position to be actuated by the air escaping through said diaphragm, and
   (g) a lateral air inlet conduit communicating with said housing between said diaphragm and said one end of the housing which is adapted to be connected to the valve stem.

2. In a pressure warning device as defined in claim 1 in which the diaphragm is urged toward the projection by a compression spring interposed between said diaphragm and a spring abutment carried by said housing.

3. In a pressure warning device as defined in claim 1 in which the sharp projection is carried by a transverse member secured to the inner surface of said housing, there being at least one passageway through said transverse member in position for air to flow therethrough and through said diaphragm upon rupture of the diaphragm by said sharp projection.

4. In a pressure warning device for a pneumatic tire having a valve stem:
 (a) a cylindrical housing adapted to be connected at one end to the valve stem,
 (b) a disc-like diaphragm extending transversely of said housing,
 (c) means securing the periphery of said diaphragm to said housing to provide an air-tight connection therewith and permit flexing of an inner portion of said diaphragm,
 (d) a sharp projection carried by said housing in position to rupture said inner portion of the diaphragm upon a predetermined amount of movement of said inner portion of the diaphragm toward said projection,
 (e) an elongated member adapted to extend axially of said cylindrical housing with one end thereof in contact with said diaphragm,
 (f) there being a longitudinally extending passageway through said elongated member in position for one end of said passageway to receive said sharp projection,
 (g) resilient means urging said diaphragm toward said projection with a force to move said diaphragm into contact with said projection upon a predetermined change in pressure in the tire whereby said projection ruptures said diaphragm to permit the escape of air through said diaphragm into the passageway of said elongated member,
 (h) warning means carried by said elongated member in position to be actuated by the air escaping through said diaphragm, and
 (i) a lateral air inlet conduit communicating with said housing between said diaphragm and said one end of the housing which is adapted to be connected to the valve stem.

5. In a pressure warning device as defined in claim 4 in which the resilient means urging the diaphragm toward the projection comprises a compression spring surrounding said elongated member and stop means carried by said elongated member and said housing in position to engage said spring whereby upon movement of the spring to uncompressed position the diaphragm is urged toward said projection.

6. In a pressure warning device as defined in claim 5 in which releasable catch means is provied between said elongated member and said housing to hold said compression spring in compressed position until the pressure within the tire reaches a predetermined amount.

7. In a pressure warning device as defined in claim 4 in which the end of said passageway receives said projection with a snug fit and releasable catch means is provided between said elongated member and said housing to hold said passageway in firm contact with said projection whereby the escape of air through said diaphragm is retarded.

8. In a pressure warning device as defined in claim 5 in which the means securing the periphery of the diaphragm to the housing and the stop means carried by the housing in position to engage the compression spring comprise inturned annular flanges formed integrally with opposite ends of a sleeve-like member which telescopes within said housing.

9. In a pressure warning device as defined in claim 4 in which the sharp projection is formed integrally with a tranverse member which is secured within said housing, there being an air passageway through said transverse member.

References Cited in the file of this patent
UNITED STATES PATENTS
1,424,278  Brown _____ Aug. 1, 1922